April 16, 1957  M. NOVAKOVICH  2,789,207
COMBINED MIRROR AND LIGHT
Filed Feb. 16, 1956
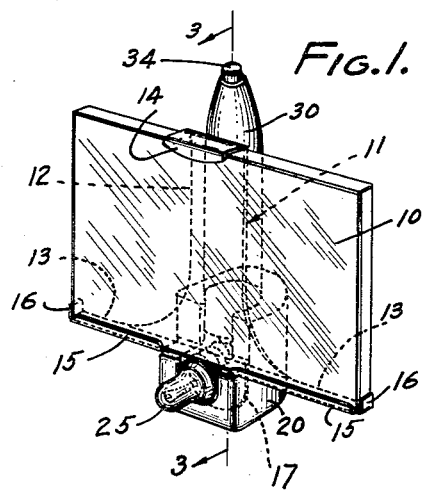
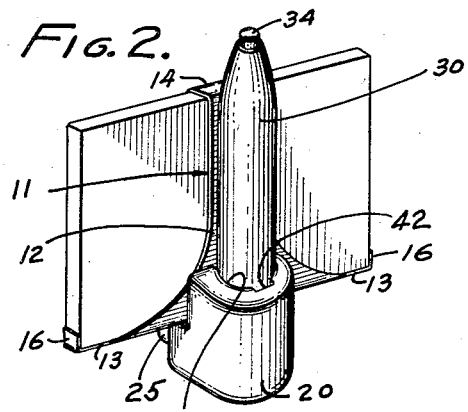
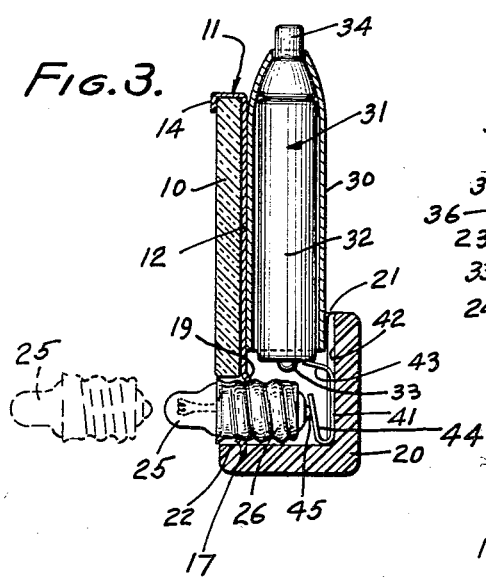
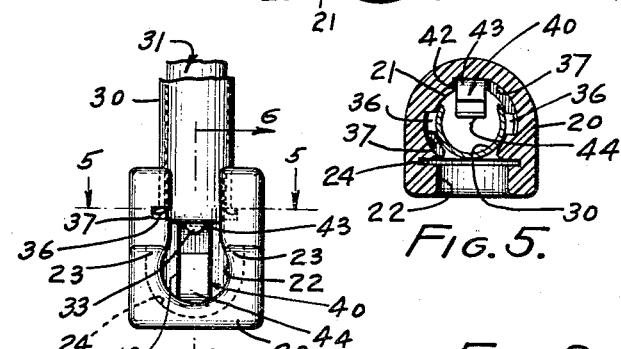
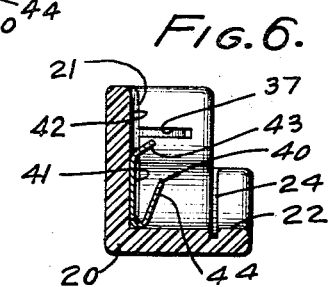
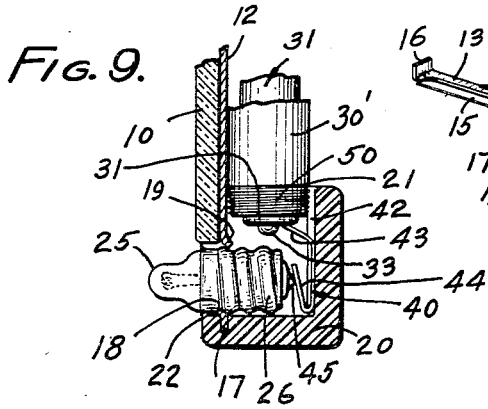
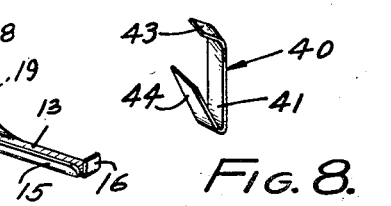
INVENTOR.
MILAN NOVAKOVICH
BY
N. J. Stevenson

United States Patent Office 2,789,207
Patented Apr. 16, 1957

2,789,207

COMBINED MIRROR AND LIGHT

Milan Novakovich, Los Angeles, Calif.

Application February 16, 1956, Serial No. 565,847

5 Claims. (Cl. 240—4.2)

This invention relates generally to women's handbag accessories and is concerned more particularly with a small portable mirror used when applying make-up or lipstick to the face. Specifically, the invention pertains to a mirror embodying a small battery-operated light for illuminating the face when the mirror is put to use in the darkness.

It is common practice for women to carry in their purses a small mirror which is used when applying lipstick and other cosmetics to the face. Such a conventional mirror obviously has no utility in the darkness since the face is not reflected therein. Consequently, when it is desired to condition the face or primp the hair while riding in a car, when attending the theater or when present at any other function in the darkness, it is virtually impossible to carry out the operation unless the woman first locates a lighted area.

It is therefore an object of the invention to provide a hand mirror of the type capable of being carried in a purse or other holder and embodying a light by which the face and hair may be illuminated to reflect in the mirror when the latter is used in the darkness of night or within a darkened area such as a theater.

Another object of the invention is to provide a combined portable mirror and light which includes a small flashlight mounted at the back of the mirror and carried by a thin sheet metal holder having integral clip means engageable with the upper and lower edges of the mirror, said holder also having ears engaging the lower portions of the side edges of the mirror to hold the latter in place.

Another object of the invention is to provide a combined mirror and light which includes a hollow base element located adjacent the bottom edge of the mirror and having a vertical opening or slot in its front side, the material at the sides and bottom of the slot being cored to provide a substantially semicircular groove for receiving the vertical and bottom edges of a downwardly projecting ear of the holder which is slid into said grooves, the ear having a hole so shaped as to provide partial screw threads. According to another feature and object of the invention, the slot of the base element is narrowed at the level of the upper portion of the hole in the ear so as to provide, in effect, a socket having upper flanges. By this structure the mirror holder and base element are adapted to be held in assembled relation by the screw base of a small flashlight bulb which is screwed through the threaded hole of the ear and which engages said flanges to lock the ear in the base element. The small light bulb thus is located at the bottom central portion of the mirror to direct its light rays forwardly.

Another object of the invention is to provide a combined mirror and light in which the base element has a vertical socket provided in its sides with bayonet grooves, or screw threads, for receiving bayonet lugs, or screw threads, at the lower end of a battery container or shell to mount the latter in position to project upwardly from the base element at the rearward side of the mirror.

Another object of the invention is to provide a combined mirror and light, of the character referred to, having a simple and highly practical means for closing the electrical circuit through the battery and light bulb. In accordance with the present concept, this means includes a battery slidable in the container, a depressible operating button at the upper end of the container and operative to slide the battery downwardly against the action of a contact element in the form of a leaf spring pocketed within the base element. The contact spring has an upper laterally-bent end engageable with the metal case of the battery and normally operative to maintain the battery elevated, and an upwardly inclined finger engaging the central contact of the electric lamp. By this specific structure, when the battery is slid downwardly by means of the operating button, against the action of the contact spring, the central terminal at the lower end of the battery is caused to engage the screw base of the lamp to close the electrical circuit and thereby establish current flow from the central terminal of the battery, through the lamp base, lamp filament and central contact of the lamp to the contact spring and thence to the metal case of the battery. The contact spring thus serves the dual purpose of establishing electrical contact between the lamp and the battery case and of returning the battery to circuit-opening position.

A further object of the invention is to provide a mirror and flashlight unit which is extremely simple in construction with the parts thereof adapted for economical mass production and quick assembly without the use of screws, rivets or other extraneous parts and without the employment of tools.

Further objects of the invention will appear from the following description and from the drawing which is for the purpose of illustration only, and in which:

Fig. 1 is a perspective view of the mirror and light unit as viewed from the front thereof;

Fig. 2 is a perspective view of the same as viewed from the rearward side thereof;

Fig. 3 is a vertical sectional view, taken on line 3—3 of Fig. 1;

Fig. 4 is a front view of the base element and battery container with the mirror, mirror holder and lamp omitted;

Fig. 5 is a sectional plan view, taken on line 5—5 of Fig. 4;

Fig. 6 is a vertical sectional view, taken on line 6—6 of Fig. 4;

Fig. 7 is a perspective view of the mirror holder;

Fig. 8 is a perspective view of the contact spring; and

Fig. 9 is a view similar to Fig. 3, illustrating a slightly modified structure.

Referring to the drawing in detail, the invention includes a conventional rectangular mirror 10 of the type usually carried in a purse or handbag. Adapted for attachment to the mirror 10 is a holder 11 which, as shown in Fig. 7, is a sheet metal stamping having a vertical portion 12 and lateral arms 13 extending in opposite directions. The upper end of the vertical portion 12 has a hook or clip portion 14 engageable over the upper edge of the mirror. The lateral arms or wings 13 engage against the lower edge of the mirror and have flanges 15 engaging the lower portion of the front face of the mirror. At the outer ends of the wings 13 are upstanding fingers 16 which engage the lower portions of the vertical edges of the mirror to prevent relative lateral movement between the mirror and holder. The vertical portion 12 is extended downwardly below the wings 13 and mirror in a rounded ear 17 provided with a central hole 18. Opposite edges of the hole 18 are provided with fins 19 forming partial screw threads.

The mirror-light unit also includes a base element 20 which is preferably molded from plastic material. The element 20 consists of a block molded to provide a vertical opening or socket 21 (Fig. 5). The front portion of the element is reduced in height and has a horizontal opening or socket 22 (Fig. 4). The upper portion of the socket 22 is narrowed so as to provide shoulders 23. The material at the sides and bottom of the socket 22 is cored to provide a substantially semicircular groove 24 for receiving the ear 17 of the holder 11 therein. The device employs a small battery-operated electric bulb or lamp 25 which has the usual screw-threaded base 26. Preferably, the lamp is of the type in which the glass is thickened at the outer end to provide a magnifying lens.

Referring to Figs. 1 to 3, it will be seen that to connect the base element and mirror, the ear 17 is first slid into the groove 24 until the bottom edge of the mirror rests upon the shouldered front portion of the base element. The electric lamp 25 is then applied by screwing its base 26 through the hole 18 of the ear 17. Since the ear 17 is held against lateral movement by its engagement in the groove 24 and retained against upward movement by reason of the engagement of the lamp base 26 against the shoulders 23, it is seen that the lamp itself provides a locking means for maintaining the base element 20 connected to the mirror 10.

The device also includes a container 30, in the form of a thin-walled metal shell. Held in the container 30 and arranged for vertical sliding movement therein is a small dry cell battery 31 having a metal case 32 and a central terminal 33 at its lower end. An operating button 34 is slidable in an axial opening at the upper end of the container 30 and is adapted, when depressed, to force the battery 31 downwardly. The container 30 has bayonet lugs 36 at its lower end, these lugs being engageable in bayonet slots 37 formed in the curved wall of the base element defining the vertical socket 21. Thus, by inserting the lower end of the container 30 into the socket 21 and turning the container, the latter is releasably mounted in vertical position on the base element.

Pocketed within the base element 20 is a spring contact element 40. As shown in Fig. 8, the contact element 40 has a vertical portion 41 seated in a vertical groove 42 in the base element 20. At the upper end of the portion 41 is a laterally extending end 43 providing a leaf spring engaging against the lower end of the metal case 32 of the battery 31 and normally operative to maintain the battery in its elevated position. An inclined finger 44 at the lower end of the contact spring 40 engages the central contact 45 of the electric lamp 25.

Assuming that the device is assembled as shown in Figs. 1 to 3, the battery 31 is held elevated in the container 30 under the influence of the leaf spring 43 with the central terminal 33 of the battery located above the metal base 26 of the lamp 25. When the woman wishes to use the mirror while in a dark place, she holds the device in one hand at a level with her face, with the thumb of the hand engaging the lower surface of the base element 20 and with the forefinger engaging the operating button 34. By depressing the button 34, the battery 31 is forced downwardly against the action of the leaf spring 43 until the terminal 33 of the battery contacts the metal base 26 of the lamp 25. Now, since the contact spring 40 provides an electric conductor between the central contact 45 of the lamp and the metal case 32 of the battery 31, a closed electric circuit is effected to cause the lamp 25 to light. The light rays are projected onto the face to cause reflection in the mirror and the woman may then, with her free hand, apply powder or lipstick to the face or comb her hair. After the mirror has served its purpose, the button 34 is released to allow return movement of the battery 31 whereupon the circuit is broken to extinguish the light.

When it is necessary to replace the battery, the container 30 is turned and lifted from the base element 20, the battery 31 is removed and replaced by a fresh battery and the container then re-positioned on the base element.

Referring to Fig. 9, the container 30′ may be provided with conventional screw threads 50 at its lower end to adapt the container to be screwed into the similarly threaded upper end of the socket 21.

It will be observed from the foregoing that the present invention provides a very simple and highly practical illuminated mirror adapted as a handbag accessory. As a particular feature of improvement, the parts are so constructed and arranged that a base element, for supporting the battery, electric lamp and associated parts, is connected to the mirror holder by the lamp which in itself serves as a locking means. As another feature of improvement, there is embodied in the base element a double finger contact spring which, in addition to providing an electric conductor, also functions as a means for returning the battery to inoperative position so as to normally maintain the circuit open.

In accordance with the provisions of the patent statutes, I have herein described the principle of the invention, together with the structures which I now consider to represent the best embodiments of the invention. I wish to have it understood, however, that various modifications might be made in the device without departing from the spirit or scope of the invention as defined in the appended claims.

I claim as my invention:

1. A combined hand mirror and light, comprising: a mirror; a holder having clip means engaging the upper and lower edges of the mirror; a hollow base element; interengaging means on said holder and said base element for connecting the same with the base element located adjacent the bottom edge of the mirror, said base element having a socket in a side thereof directed toward the front of the mirror; an electric lamp disposed in said socket for directing light onto the face of the user of the mirror; a container carried by said base element and extending upwardly therefrom along the back of the mirror; a metal-cased battery slidable in said container and having a central terminal engageable against the metal base of the lamp; means for sliding the battery toward said metal base; and a spring element disposed within said base element and providing an electrical connection between the central contact of the lamp and said metal case of the battery, said spring element engaging said metal case of the battery and being normally operative to slide the battery in a direction to withdraw its central terminal from engagement with the metal base of the lamp.

2. A device as defined in claim 1 in which said spring element has a vertical portion disposed in a vertical groove within said base element, an upper, laterally extending end engaging the metal case of the battery, and an inclined finger at its lower end for engagement with the central contact of the lamp.

3. A device as defined in claim 2 in which said mirror holder is of sheet material and has wings underlying the bottom edge of the mirror, said wings having upturned fingers at their free ends engaging the vertical edges of the mirror.

4. A device as defined in claim 3 in which said holder has a depending ear provided with a hole, said ear being insertable in a vertical slot in said base element and locked therein by said lamp which extends through said hole.

5. A device as defined in claim 4 in which said ear has fins providing partial screw threads and in which said base element has shoulder means located adjacent the upper end of its said vertical slot, said lamp having a screw-type base screwed through said hole in said ear, upward movement of said lamp being prevented by said shoulder means so that the lamp locks said ear in said base element.

References Cited in the file of this patent
UNITED STATES PATENTS

| | | |
|---|---|---|
| 1,282,615 | Mizrahi | Oct. 22, 1918 |
| 1,969,196 | Barber et al. | Aug. 7, 1934 |
| 2,120,238 | Brush | June 14, 1938 |
| 2,386,255 | Morey | Oct. 9, 1945 |
| 2,400,974 | Berman | May 28, 1946 |
| 2,645,706 | Bowland | July 14, 1953 |
| 2,678,995 | Miller | May 18, 1954 |